United States Patent [19]
Houser et al.

[11] Patent Number: 5,411,377
[45] Date of Patent: May 2, 1995

[54] MASS DISPLACEMENT WAVE ENERGY CONVERSION SYSTEM

[76] Inventors: Michael P. Houser, 525 Kern Ave., Morro Bay, Calif. 93442; Dwight F. Houser, 835 Wells Fargo Loop, Jacksonville, Oreg. 97530

[21] Appl. No.: 33,643

[22] Filed: Mar. 17, 1993

[51] Int. Cl.⁶ .............................................. F03B 3/12
[52] U.S. Cl. ..................................................... 417/333
[58] Field of Search ............... 417/330, 331, 332, 333; 60/496, 497, 505

[56] References Cited

U.S. PATENT DOCUMENTS

| | | | |
|---|---|---|---|
| 1,763,191 | 6/1930 | Sealy et al. | 417/333 |
| 3,970,415 | 7/1976 | Widencrantz | 417/332 |
| 4,174,192 | 11/1979 | Daddario | 60/496 X |
| 4,206,601 | 6/1980 | Eberle | 417/330 X |
| 4,313,716 | 2/1982 | Jones | 417/331 |
| 4,413,956 | 11/1983 | Berg | 417/333 |
| 4,480,966 | 11/1984 | Smith | 60/496 X |

Primary Examiner—Richard E. Gluck
Attorney, Agent, or Firm—David O'Reilly

[57] ABSTRACT

A mass displacement wave energy conversion system comprising a platform mounted on a stable base to protect the system against the interference of wave motion. Beneath the platform are mounted a plurality of pumps operated by a buoyancy vessel and a ballast mass. The buoyancy vessel and ballast mass are attached to a sleeve pump on a shaft supported in the ocean floor by an anchored footing with the other end being secured to the system platform. The pumps are connected to a manifold so they accumulate a constant volume and pressure even though each pump operates separately. The ballast mass buoyancy vessel and pump are constructed to slide on the mounting shafts to produce water at a constant pressure and volume at the manifolds that can be interconnected to drive a variety of devices.

12 Claims, 5 Drawing Sheets

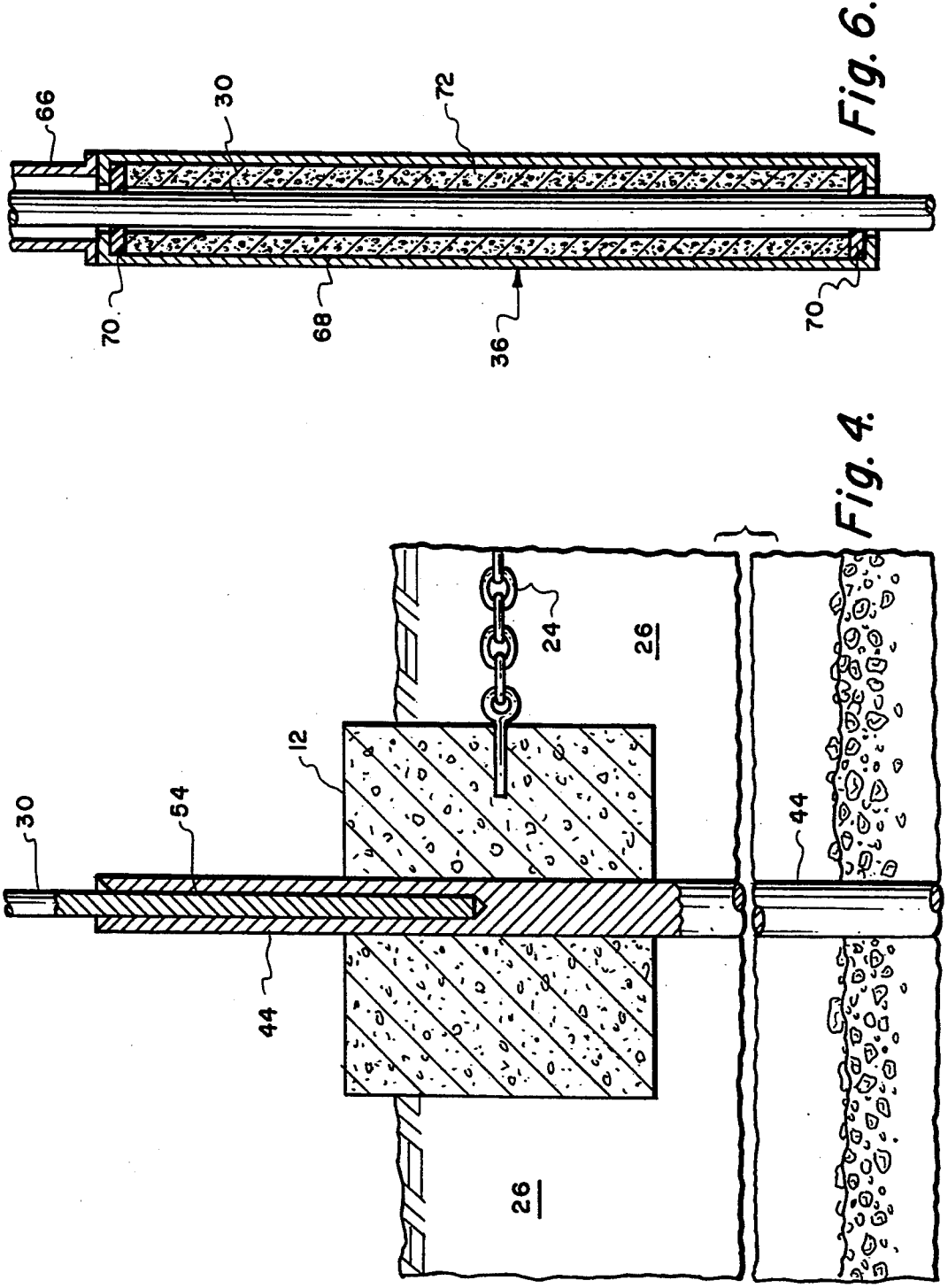

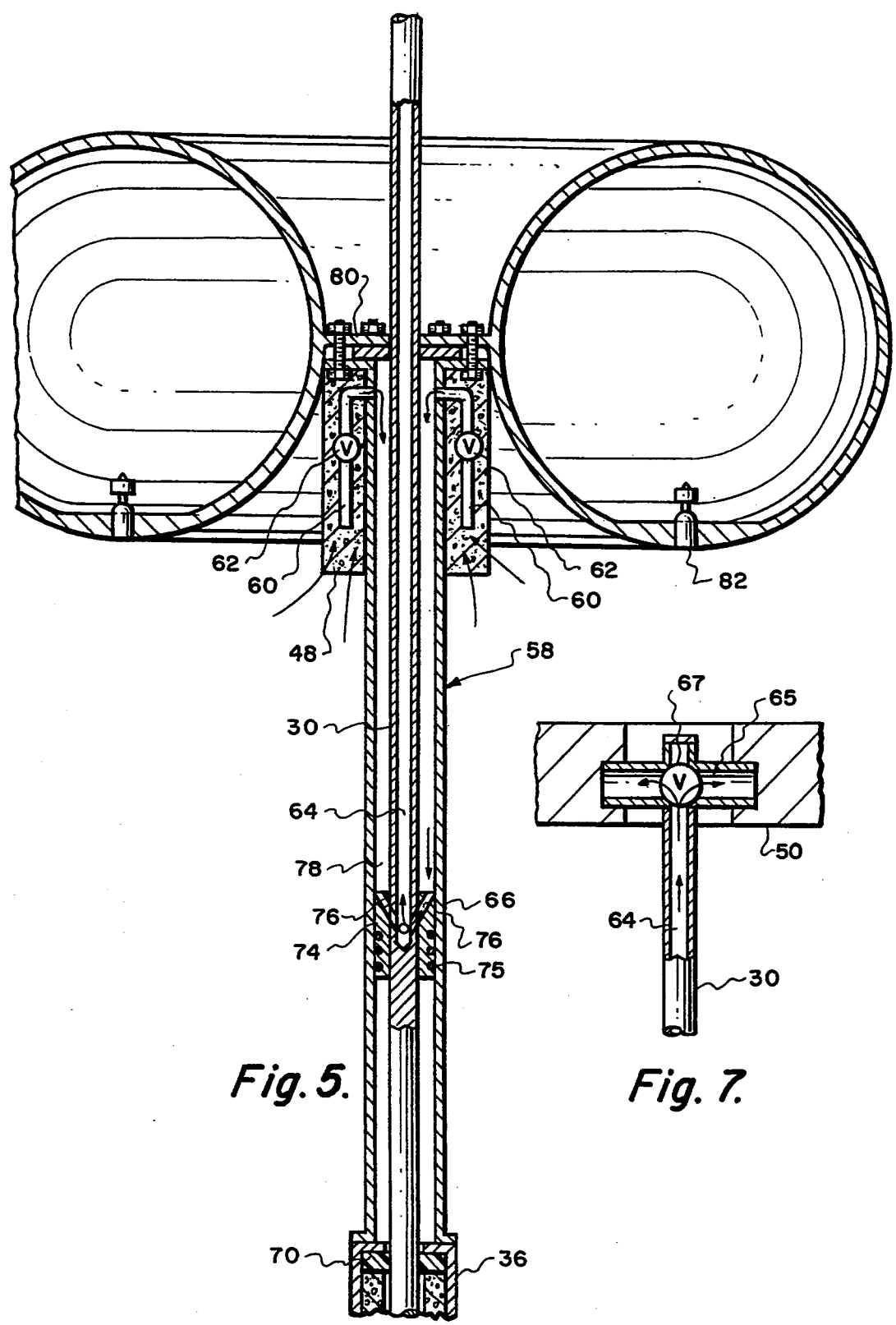

MASS DISPLACEMENT WAVE ENERGY CONVERSION SYSTEM

FIELD OF THE INVENTION

This invention relates to wave energy conversion systems and more particularly relates to an installation that uses mass displacement to convert wave energy.

BACKGROUND OF THE INVENTION

New sources of energy for producing power are needed. There is also a need for environmentally safe renewable energy source that can be used to supply the ever increasing need for potable water, electrical power, energy for replacing automotive gasoline and other sources of energy. One source of such energy that is a natural first choice is the ocean and its wave motion.

Systems have been proposed for using wave motion as an energy source but a very small percentage have been put to use. A number of these systems have been patented but have not been adopted for widespread use for a variety of reasons. Most of these systems used closed loop hydraulic systems, cable movements, rack and pinion gearing devices, air pumps, and bellows to enhance and convert wave energy. However most of these systems fail to utilize any specifically designed ballast mass as a driving force. They are generally dependent on the buoyancy of flotation elements as their prime mover. Gravity acting on those elements is a reciprocative force.

One such device is disclosed and described in U.S. Pat. No. 4,091,618 issued May 30, 1978. This patent describes a wave motion power generating system having floating buoys attached to a pump which pump water from a container submerged below water level. In a preferred embodiment the patent discloses buoys in the form of cylindrical links mounted on the leg of ocean platforms. The tank below the water level, provides a void to create a hydrostatic head. The pumping system comprised of the buoys mounted on the legs of an ocean platform remove water from the tank to create the void with the water being refilled to cause water movement as in a siphoning conduit. This patent involves no use of any mass displacement to create or convert the wave energy. This patent describes only the use of a buoyancy force of wave action on floats to create a hydrostatic head. The power generator is mounted on the ocean platform.

A device for deriving mechanical power from wave motion is also disclosed in U.S. Pat. No. 1,377,163. This patent discloses a pump having a cylinder that is raised and lowered on a hollow piston or drive rod. As the water level rises a buoyant cylinder pressurizes water in a compartment below the piston so it can be used to operate a turbine. Fluid in the cylinder passes through either side of the fixed piston to drive the turbines. The buoyancy of the cylinder is the driving force of this patent and the downward stroke is dependent upon gravitational force. Also in this patent the turbines are not mounted within the drive assembly.

Another patent that utilizes the force of water to drive a piston up and down is disclosed in British Pat. No. 2,093,124A. In this patent the movement of the piston and cylinder causes a change in the length of the pivotally connected water driven shaft. In this patent the water driven member is a float that is driven up and down by a head of water. The force driving the float up and down can be the motion of the tide or ocean. The motion of the float compresses pistons on the up stroke and compresses a second set of pistons on a downward stroke. This device represents a water engine to create pressure which is stored in an accumulator. This device is complicated in construction with many pivotal points and pivoting links that discourages use. It also requires controlling of water level in a float.

Other patents that disclose or describe systems that utilize wave motion to produce energy are in U.S. Pat. No. 1,523,031 issued Jan. 13, 1925; U.S. Pat. No. 2,009,939 issued Mar. 18, 1935; U.S. Pat. No. 4,076,463 issued Feb. 28, 1978; U.S. Pat. No. 4,208,878 issued Jun. 24, 1980; U.S. Pat. No. 4,218,192 issued Aug. 19, 1980; U.S. Pat. No. 4,434,375 issued Feb. 28, 1984; and U.S. Pat. No. 4,563,591 issued Jan. 7, 1986. Most of these devices are unacceptable because they are complicated and difficult to produce and maintain. Many use buoyancy factors of a float as a working force. None teach or describe the use of mass displacement for effectively producing or converting wave energy.

It is one object of the present invention to provide a mass displacement wave energy conversion system comprised of a series of pumping devices anchored in wave concentrations.

Still another object of the present invention is to provide a mass displacement wave energy conversion system that has a series of pumping devices that are anchored by footings submerged in the sea floor and are held in position by platforms above the high water mark.

Still another object of the present invention is to provide a mass displacement wave energy conversion system that utilizes wave oscillation to pressurize water to the desired working force. The cylinder and piston head diameters of the pumps control the required ballast weight to achieve desired water pressures.

Yet another object of the present invention is to provide a mass displacement wave energy conversion system having buoyancy vessels that are minimally submerged in the wave action to cause the pump elements to be extended to the cresting point of the waves. As waves oscillate through their cycles to a trough position the buoyancy vessel is pulled down to a neutral buoyancy state in the trough by the weight of the ballast compressing water through its pumping network to work stations.

Still another object of the present invention is to provide a mass displacement wave energy conversion system that permits the development of a wave energy conversion farm in the ocean environment that acts as a man-made reef giving protection to sea creatures. It also can provide an added benefit of protecting shore lines by diminishing wave energy to reduce destruction of action on beaches.

BRIEF DESCRIPTION OF THE INVENTION

The purpose of the present invention is to utilize mass displacement for wave energy conversion through a series of pumps.

The mass displacement wave energy conversion system has a group of pumps retained in the wave motion by individual shafts that are anchored in the sea floor. These pumps oscillate on these shafts which are retained in the sea floor by a casing and a footing. The upper end of each shaft is secured to a platform positioned at a height above high tide and wave activity. The platform is preferably secured in position by corner supporting super structures or heavy columns angled to form a pyramid structure that minimizes wave interference. The super structures or heavy columns are also secured in the sea floor by footings at one end and by centering and securing each to the platform at the upper or other end.

Each pumping unit of the system is comprised of a buoyancy vessel that rides the crest and trough of the ocean waves. The pumps are designed and sized to carry submerged masses with minimal draft. Compression cylinders of the pumps have a length designed to travel the extremes of tide and wave activity and have diameters designed to develop required pressures. A ballast cylinder of preselected weight pulls the compression cylinder through its descending power stroke.

The pumps of the system are preferably designed for use in water of approximately one hundred (100) foot in depth with a maximum tidal change of approximately ten (10) feet. Waves can vary from two (2) feet to storm conditions of up to twenty (20) feet in waters typical of the west coast of the United States. The footing for each pump shaft is a cube of concrete embedded in the ocean floor. The main shaft for each pump extends from the ocean floor below the footing to the bottom of a platform anchored in the ocean floor where a high pressure manifold is provided. A piston is attached to the shaft at the midpoint of the ocean tide action. A passage through the shaft from the piston to the high pressure manifold is provided for pressurized water to flow. A buoyancy vessel, preferably in the form of a toroid, is attached to a pump sleeve mounted on the main shaft with a ballast ram being attached to the bottom of the sleeve.

The buoyancy vessels follow the rise and fall of the waves as they go through their action. The sleeve pump with the ballast squeezes water past a piston head and up through a main passageway in the shaft into a manifolding network. As the pumping system rises water is sucked into a high pressure chamber through a filter via intake tubes and check valves. The amount of water being pressurized will vary according to the height of the waves. It is estimated that a two foot wave traveling at about thirteen second intervals can pressurize approximately seventy-four gallons per minute per pump. With this system we can provide a significant amount of water at a substantial amount of pressure that can be used for a variety of purposes. It can be used for forcing the water through an osmosis membrane to remove the salt to provide potable water. The pressurized water can also be used to drive a turbine capable of generating electrical power. The primary use of the output will be the production of portable water and electrical or mechanical power.

The above and other features of this invention will be fully understood from the following detailed description and the accompanying drawings, in which:

BRIEF DESCRIPTION OF THE DRAWINGS

FIG. 4 is a partial section illustrating the anchoring of the mass displacement pumps in the ocean floor.

FIG. 5 is a view in partial section of the mass displacement pump drive sub-assembly taken at 5—5 of FIG. 3.

FIG. 6 is a partial section of a mass displacement pump ballast ram taken at 6—6 of FIG. 3.

FIG. 7 Is a partial sectional view of the pump sleeve assembly taken at 7—7 of FIG. 3.

DETAILED DESCRIPTION OF THE INVENTION

Figure 1:
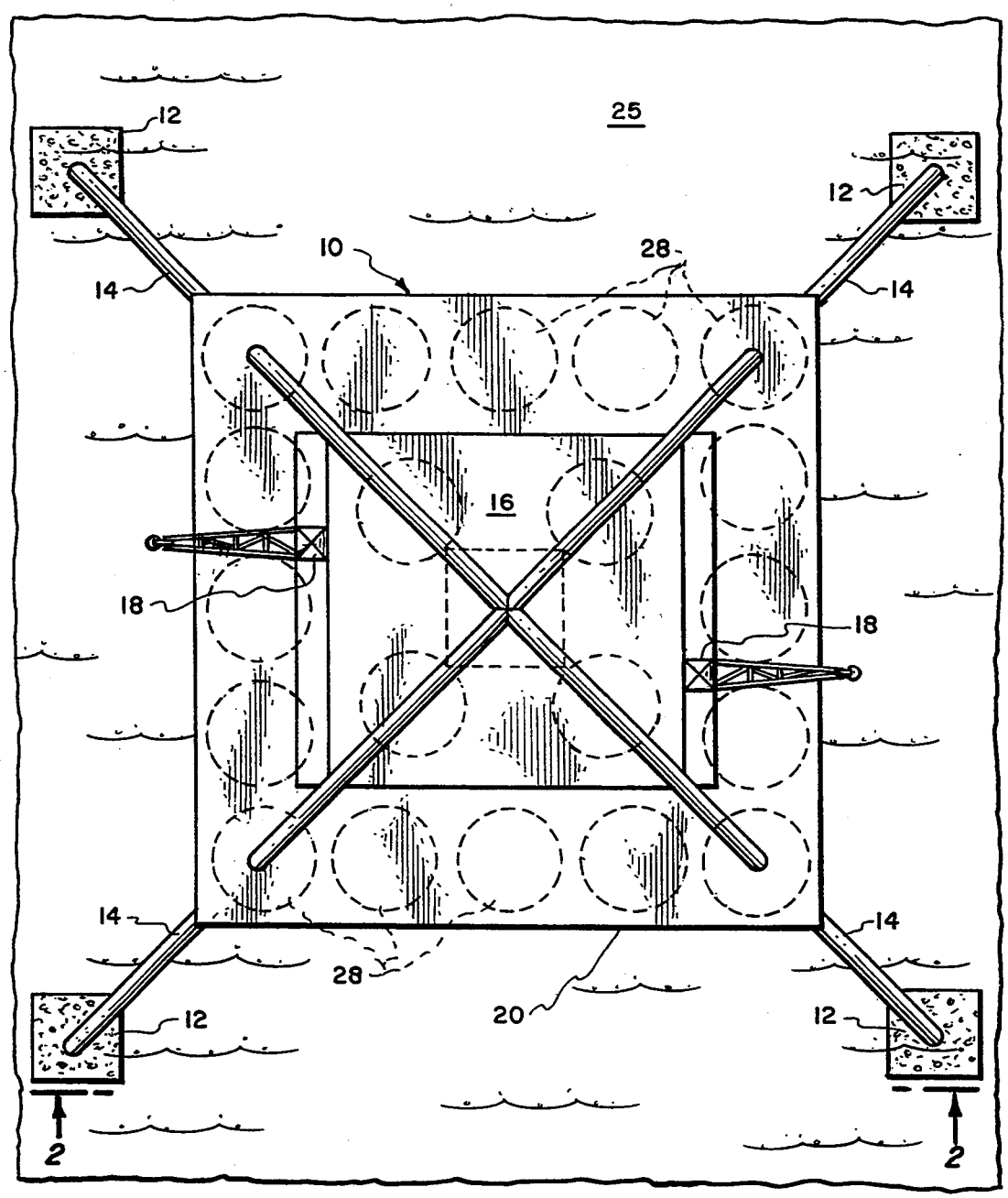
FIG. 1 is a top plan view of a mass displacement wave system constructed according to the invention.

A mass displacement wave energy conversion system is illustrated generally in FIG. 1. The mass displacement wave system can be used to create mass displacement wave farms for converting wave motion into usable energy. As shown in FIG. 1, the mass displacement system is comprised of a platform 10 anchored to the ocean floor by footings 12 and supported by columns 14 to form a pyramid-like structure. This structure minimizes the effect of wave interference. Platform 10 has upper deck 16 provided above lower deck 20 for supporting heavy cranes 18 for moving equipment and maintaining the system. Lower deck 20 of platform 10 is provided with a building 22 that will house various power generating or utilization equipment. Such equipment can be reverse osmosis filtering units, electrical power generators or catalytic hydrogen generators as desired. Additionally control building 22 could be land based.

Platform 10 and columns 14 are supported by footings 12 that can be reinforced with steel and further supported by additional reinforcing struts 24 such as steel rods, cable or chains interconnected all the footings for the super structure as well as all the footings for the pumps as will be described hereinafter. A plurality of mass displacement pumping systems 28 supported on shafts 30 (FIG. 2) are also anchored in the ocean floor 26 by footings 32 and support platform 10 at the other end. Pressurized water from mass displacement pumps 28 are carried to control room in control building 22 by manifolds and piping.

Figure 2:
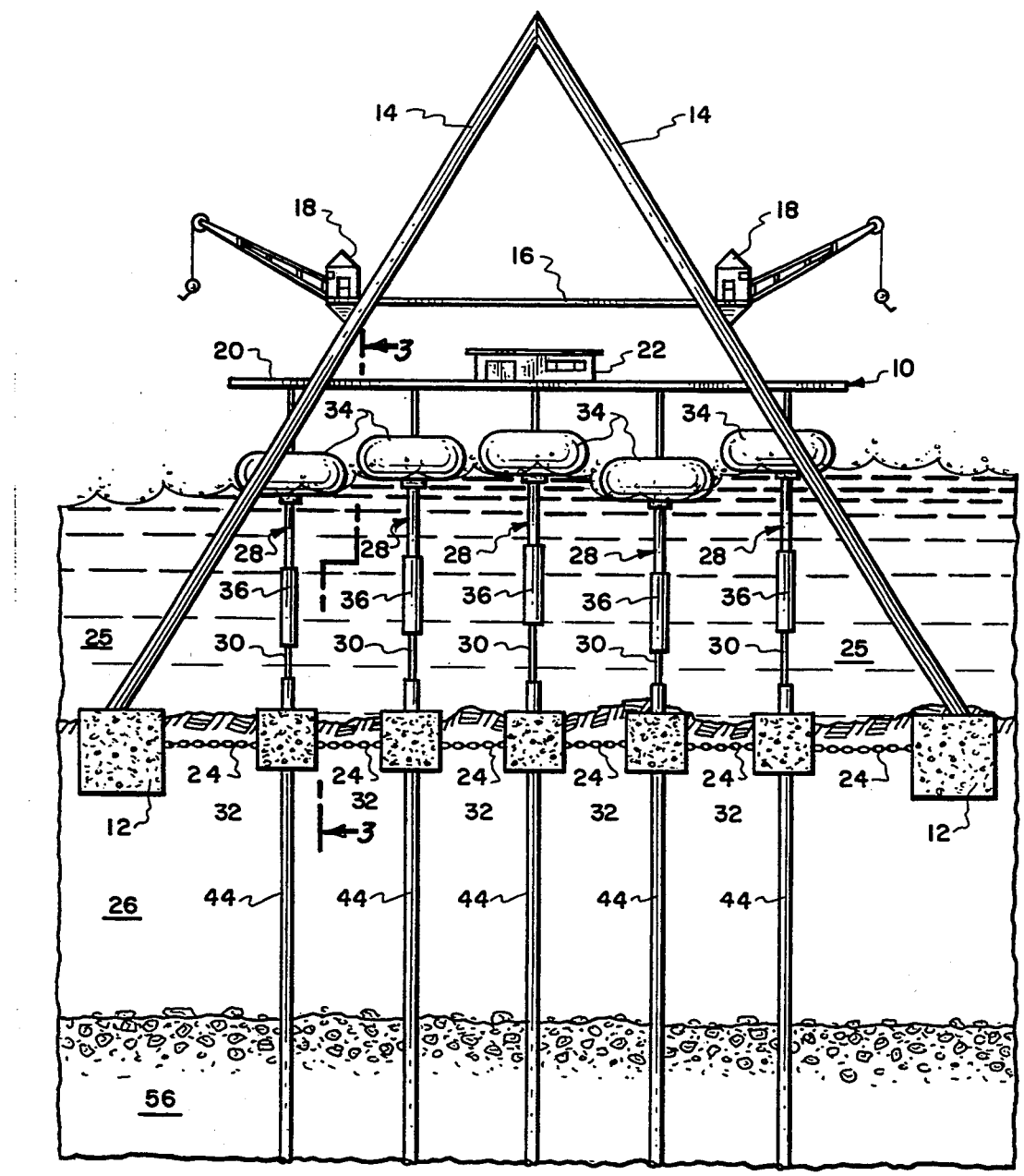
FIG. 2 is a side elevation of a mass displacement wave energy conversion system constructed according to the invention taken at 2—2 of FIG. 1.
Figure 3:
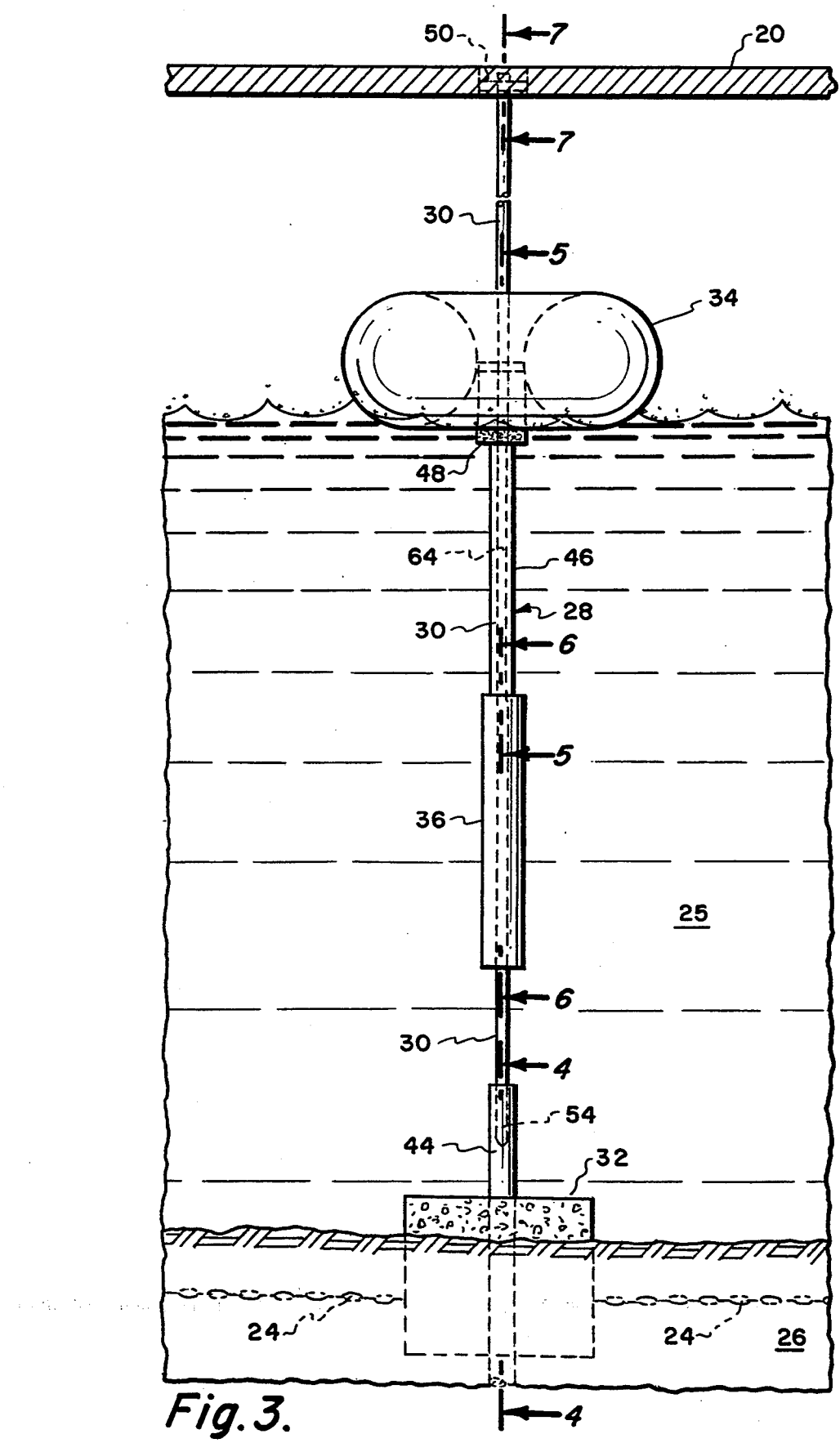
FIG. 3 is a diagram of a mass displacement pump for use in the system of FIG. 1.

As shown in FIG. 2 each pumping system 28 is comprised of a buoyancy device 34 and ballast 36 as will be described in greater detail hereinafter. Buoyancy device 34 and ballast 36 create the pumping action by riding on each shaft 30. The shaft being seated in the sea floor 26 at the lower end and securely attached to platform 10 at upper end 40 provide additional support for the platform as well as supporting each pump 28. Thus a stable system having great resistance to interference of the wave motion is provided.

An important feature of the invention is the creation of the pressurized water by pumps 28 shown in greater detail in sectional view of FIGS. 3 through 7. A single pump 28 is shown generally in the diagram of FIG. 3. Each pump comprises a drive assembly having anchoring footing 32 encapsulating a casing 44 which supports and retains main shaft 30. Shaft 30 guides and retains ballast ram 36, sleeve pump 46, buoyancy vessels 34, filter 48 for filtering debris from the water, and terminates in water manifold 50 receiving the pressurized water. Filter 48 is known as a roughing filter for removing debris in the sea water such as kelp and small sea animals that could clog the pump. Pump supporting shaft 30 is also securely fastened to lower deck 20 of platform 10 providing support for the platform and maintaining the position of the shaft. Shaft footings 32 are suitably secured by retaining steel rods, chains, etc. interlinking each of them.

The pump and shaft footings 32 encapsulate support casings 44 as shown in FIG. 4. Each casing 44 is provided with a socket 54 constructed to receive the end of main shaft 30. Support casing 44 preferably extends through anchor footing 32 further into the ocean floor. It would be ideal if the lower level 56 of ocean floor 26 is of a bedrock providing greater stability.

The details of pump 28 and its attachment to lower deck 20 of platform 10 is illustrated in FIGS. 5 and 7. Piston head 58 mounts on main shaft 30 at a position which is the approximate center of the height for tide and wave movement. Piston head 58 has water inlet pipes 60 and check valves 62 to control the low pressure water input and high pressure water output from pump 28. Pump piston 74 is secured to main shaft 30 adjacent the lower end of passageway 64. Compression rings 75 seal piston 74 against the wall of pump cylinder or sleeve 66. Water flowing through pipes 60, check valves 62 into pumping chamber 78 is forced through piston passageways 76 into passageway 64. Preferably there are at least four pipes 60 with check valves 62, and piston passageways 76. Passageway 64 in main shaft extends up into manifold 65 (FIG. 7) secured to lower deck 20 of platform 10.

Ballast ram 36 for pump 28 is shown in greater detail in the partial sectional view of FIG. 6. Ballast ram 36 is constructed of a sleeve 68 having sealed bearings 70 at each end filled with a suitable high density material 72 such as concrete or lead. Ballast ram 36 is free to slide on main shaft 30 and is connected to buoyancy float 34 by pump cylinder 66. The weight of ballast mass 36 supplies the necessary force to compress the sea water against the resistance of the working members or accessories such as an osmosis membrane.

Sleeve pump 28 is free to oscillate on main shaft 30 and is comprised of sleeve 66 riding on sealed bearings and piston 74 secured to shaft 30. Sea water 25 passes through filter 48 and enters through pipes 60 and check valves 62 into pumping chamber 78 between the wall of sleeve 66 and above piston 74. When sleeve pump cylinder 66 descends due to wave action on floats 34 and ballast 36 water is compressed at piston 74 causing the water to travel through passageways 76 up passageway 64 in main shaft 30 into manifold system 65 through check valves 67. Check valves 67 are shown at the entrance to manifold 65 but can be anywhere along passageway 64. The water pressure accumulates in manifold systems 65 for use in a normal osmosis system having filtering tanks and associated parts or can be used for other purposes.

Buoyancy vessel 34 is preferably in the form of a toroid and is free to oscillate on main shaft 30 with sleeve pump 28 secured to disk shaped support 80 in the center of the toroid of buoyancy vessel 34.

For protection of the system in extremely high seas and heavy storms a method is provided for submerging the entire pump system. This is provided by including a solenoid valve 82 of toroidal buoyancy vessel 34. During high seas solenoid valve 82 is opened allowing buoyancy vessel 34 to be flooded submerging the entire pump system for protecting against damage.

As shown in FIG. 1 each platform may be designed to hold twenty or more pumps 28. Additional platforms can be positioned to provide a wave motion mass displacement farm for generating energy as needed. Adjacent platforms can be interconnected as needed providing a total system to fill the needs for energy output.

The length and size of structures used with mass displacement wave energy conversion system will depend upon the ocean floors makeup, wave conditions and beach configurations. For example a greater height between high and low tide will require a longer main shaft 30. The length of sleeve pump 28 can be varied according to the particular geography including wave height and time (wave repetition time) that can be measured. During high sea conditions the inherent inertia of the drive assembly for the sleeve pump 28 is dampened due to the pump always pumping against a back pressure that acts as a shock absorber. As described previously when high seas threaten potential damage to the system, buoyancy vessel 34 can be flooded by opening control solenoid valve 82 to submerge the entire drive assembly stopping oscillations.

The system operates as follows. As buoyancy vessel 34 is lifted by the crest of a wave, sleeve pump 28 draws sea water 25 through filters 48 into intake pipes 60 through check valves 62 into reservoir or chamber 78 in pump cylinder 66. As a wave passes and the trough moves beneath buoyancy vessel 34, no longer supporting it, the appropriately weighted ballast ram 36 descends, compressing the sea water in chamber 78 forcing it through passages 76 in fixed piston 74 into passageway 64 in main shaft 30. The pressurized sea water enters manifold 65 connected to lower deck 20 of platform 10 interconnected with the manifolds of all the pumps associated with the platform to provide a constant pressure and volume. This constant pressure and volume is provided even though all of the approximately twenty or more pumps may be moving independent of each other. The constant pressure and volume of the water accumulated in manifold 65 can then be used to drive turbines, or force the water through filtration systems to produce potable water if desired.

The production of potable water from sea water by reverse osmosis filtration is known in the art and is not disclosed in detail here. Likewise the generation of electrical power by forcing water through a turbine is also know in the art. The system can also be used in standard procedures to extract hydrogen gas from an electrolyte by known hydrogen extraction procedures. For this purpose the salt saturated water from the manifold or as discharged from the turbine can be used as the electrolyte. Thus the system disclosed can be used for any process that requires power without using the usual forms such as fossil fuels. The system will achieve a constant flow of ocean water at the required pressure sufficient to force it through osmosis filtration membranes to produce drinkable water. The system could also be used to simultaneously produce potable water and also drive turbines to produce electrical energy. This is because the discharge from the osmosis filtration system would have sufficient force to drive a turbine generating electricity. The electricity from the turbine can be used to drive a catalytic converter using the waste water from the turbine as its electrolyte. From this hydrogen gas can be produced as a marketable product.

Thus there has been disclosed a unique mass displacement wave energy conversion system that can be used for a variety of purposes. The system involves the creation of a platform supported by a structure that stabilizes the system against the interference by wave motion. Beneath the platform are a plurality of pumps operated by a buoyancy system and a substantial ballast mass to operate a pump producing water at a volume and pressure desired. The output pressures of the pumps can be joined to produce potable water, electricity or used in a system to create hydrogen gas.

This invention is not to be limited by the embodiment shown in the drawings and described in the description which is given by way of example and not of limitation, but only in accordance with the scope of the appended claims.

What is claimed is:

1. A mass displacement wave energy conversion system comprising;
   a platform;
   mounting means mounting said platform in a body of water above the water level;
   manifold means;
   reciprocating pump means mounted beneath said platform, said reciprocating pump means comprising;
   a shaft anchored to the floor of said body of water at a lower end;
   a passageway in said shaft connected to said manifold means;
   a piston mounted on said shaft;
   a sleeve slidably mounted on said shaft surrounding said piston to form a pumping chamber, said pumping chamber being connected to said passageway in said shaft;
   valve means connecting an inlet to supply water to said pumping chamber;
   buoyancy vessel means mounted to reciprocate said slidable sleeve on said shaft in response to a rise and fall of the level of said body of water;
   ballast ram means connected to pull said buoyancy vessel means downward with a predetermined force, the mass of said ballast ram means forcing water under pressure from said pumping chamber through said shaft passageway and into said manifold means;
   whereby said pump means creates a volume of water at a predetermined pressure.

2. The system according to claim 1 including connecting means for connecting said shaft to said platform at an upper end.

3. The system according to claim 1 in which said shaft is anchored by anchoring means comprising; a concrete footing on the floor of said body of water; and a casing embedded in said concrete footing; said shaft being secured to said casing.

4. The system according to claim 2 in which said connecting means connecting said shaft to said platform at an upper end comprises said manifold means.

5. The system according to claim 2 in which said pump means comprises a plurality of pumps; said connecting means connecting said shaft to said platform comprises said manifold means; said manifold means interconnecting said plurality of pumps to form a conduit for receiving water from said plurality of pumps at a continuous predetermined pressure.

6. The system according to claim 1 in which said buoyancy means is connected to the upper end of said slidable sleeve; and said ballast ram means is connected to the lower end of said slidable sleeve.

7. The system according to claim 6 in which said buoyancy vessel means comprises a toroidal shaped vessel.

8. The system according to claim 7 including means for flooding said buoyancy vessel means.

9. The system according to claim 8 in which said means for flooding said buoyancy vessel means comprises a solenoid valve for releasing water into said buoyancy vessel means.

10. The system according to claim 6 in which said ballast ram means is slidably mounted on said shaft.

11. The system according to claim 10 in which said ballast ram means comprises a cylinder slidably mounted on said shaft; said cylinder being filled with a material forming a weight.

12. The system according to claim 11 in which said material forming a weight comprises concrete,

* * * * *